United States Patent [19]

Aarts

[11] Patent Number: 4,972,937

[45] Date of Patent: Nov. 27, 1990

[54] APPARATUS FOR TRANSPORTING ARTICLES

[75] Inventor: Mathias L. C. Aarts, Bilthoven, Netherlands

[73] Assignee: Product Suppliers AG, Zug, Switzerland

[21] Appl. No.: 307,935

[22] Filed: Feb. 9, 1989

[30] Foreign Application Priority Data

Feb. 9, 1988 [NL] Netherlands ................. 8800309

[51] Int. Cl.⁵ .................................. B65G 35/08
[52] U.S. Cl. ..................... 198/465.2; 198/795; 198/468.11
[58] Field of Search ............... 198/465.2, 795, 468.11, 198/803.01

[56] References Cited

U.S. PATENT DOCUMENTS

| | | | |
|---|---|---|---|
| 3,221,781 | 12/1965 | Forsstrom | 198/465.2 X |
| 3,315,778 | 4/1967 | Kendall, Sr. et al. | 198/465.2 |
| 4,040,533 | 8/1977 | DeBoer et al. | 198/465.2 X |
| 4,454,939 | 6/1984 | Kampf et al. | 198/465.2 X |
| 4,506,777 | 3/1985 | Kampf | 198/465.2 X |
| 4,699,583 | 10/1987 | Grigoli et al. | 198/465.2 X |
| 4,710,122 | 12/1987 | Villanueva | 198/795 X |

FOREIGN PATENT DOCUMENTS

| | | | |
|---|---|---|---|
| 8302191 | 6/1983 | PCT Int'l Appl. | 198/465.2 |
| 1351749 | 11/1987 | U.S.S.R. | 198/465.2 |

Primary Examiner—Joseph F. Valenza
Assistant Examiner—D. Glenn Dayoan
Attorney, Agent, or Firm—Cushman, Darby & Cushman

[57] ABSTRACT

Apparatus for transporting articles includes a closed track having rectilinear track portions. Disposed in the track are a plurality of series of carriers movable along the track and arranged to carry the articles. A drive is provided which acts on the respective rear one of a series of successive carriers, which contact each other in a non-resilient manner, for incrementally moving the carriers along the track. There is also provided a joining device which acts on the carriers of a series to keep the carriers in closed-up formation as they are moved.

8 Claims, 2 Drawing Sheets

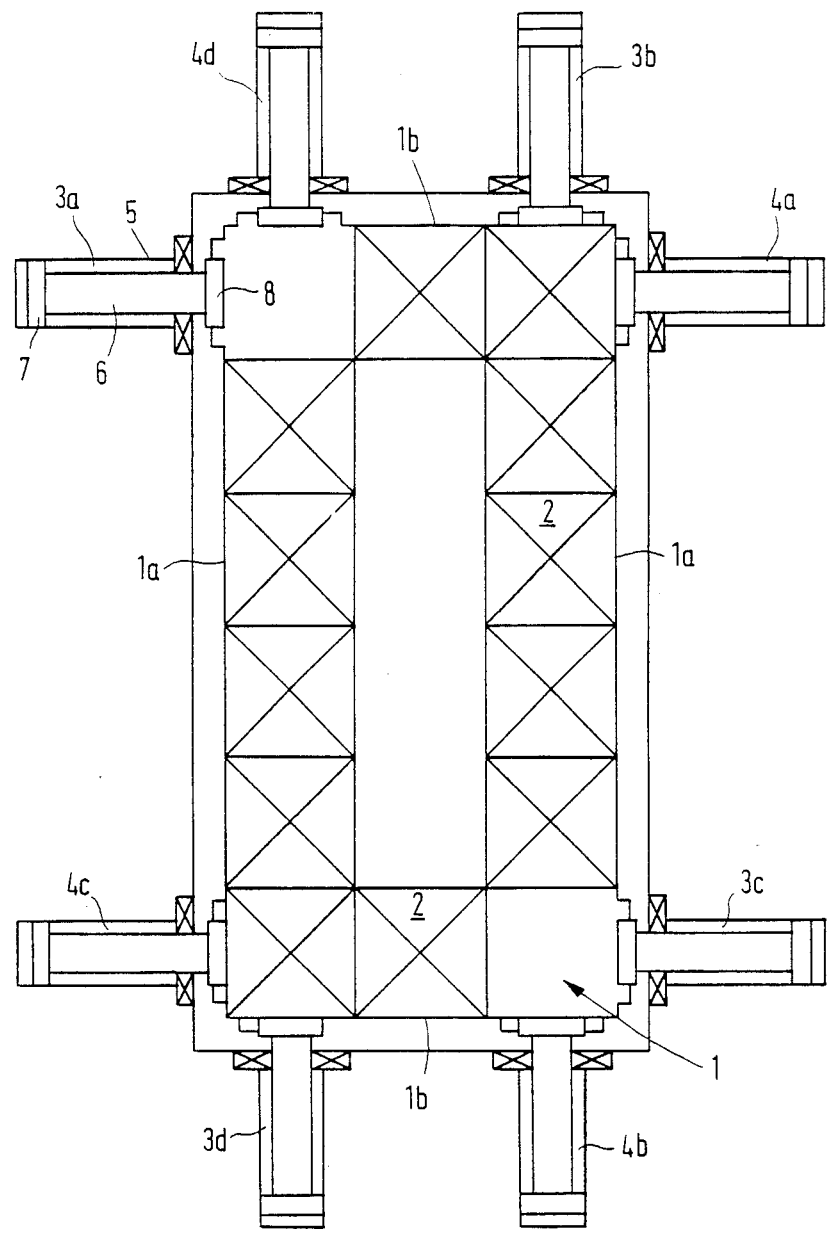
FIG·1

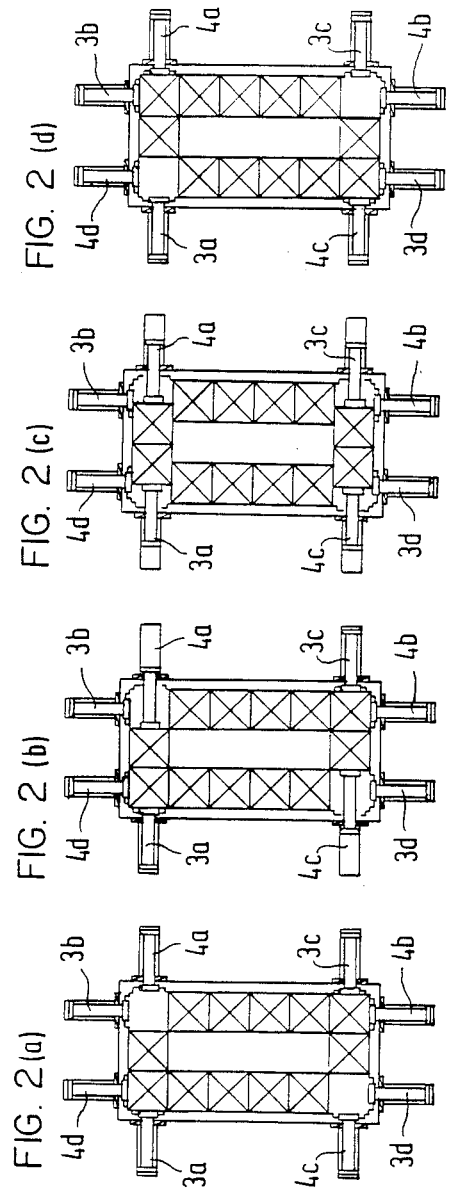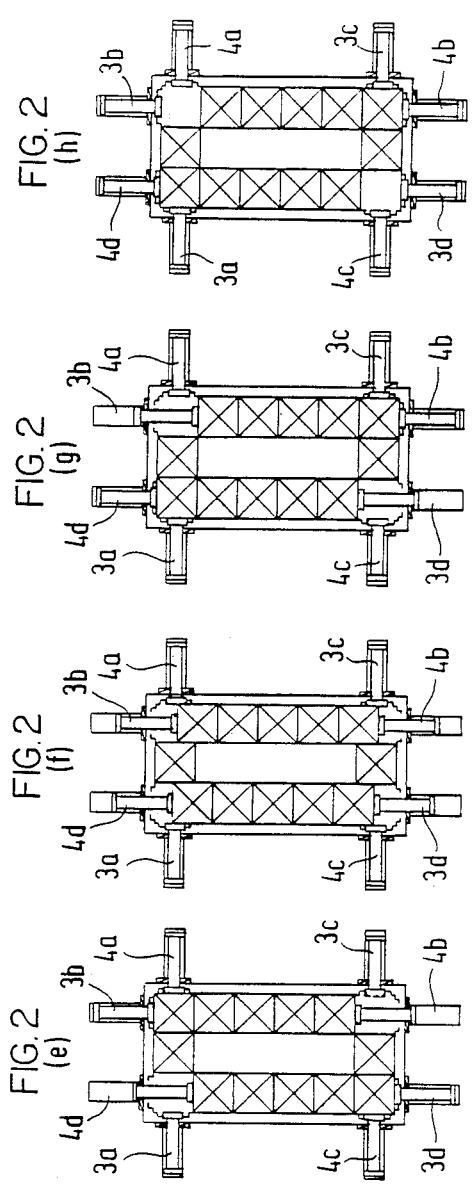

APPARATUS FOR TRANSPORTING ARTICLES

BACKGROUND OF THE INVENTION

This invention relates to apparatus for transporting articles, comprising a closed track including rectilinear track portions containing carriers for carrying the articles, and drive means arranged to act on the respective rearmost ones of a series of successive carriers for sliding the carriers stepwise over the carrier track.

Prior apparatus of this type is disclosed in German patent 149306 as a filling and packaging machine comprising a rectangular track in which rectangular carriers circulate which each carry a plurality of articles. Series of successive carriers are arranged in both the long and the short legs of the carrier track. These series are periodically moved on a given distance along the carrier track by drive means which push against the rearmost one of a series of carriers.

When the carriers are stationary, the foremost one of a series is removed, which is effected by pushing such carrier to an adjacent different series. At the same time a carrier is added at the rear of the former series of carriers from a different series of carriers. Thereafter the entire series of carriers, now with fresh rearmost and foremost carriers is again advanced by one increment. When the series is stationary, the articles carried by the carriers can be subjected to a treatment by one or more stationary treating devices. In order that these treatments may be carried out without irregularities, it is necessary for the carrier with the articles being treated to occupy an accurate position relative to the treating device. As, however, the carriers of a series are not interconnected, minor relative displacements may arise between successive carriers as they are pushed on. As a result, when the series stops a carrier may not always occupy the correct position relative to a treating device. In the prior apparatus, misalignment of a carrier is corrected by inserting two fingers of a centering means into apertures of the carrier at the position of a treating device, which fingers push the carrier into the correct position.

In other respects, too, it is disadvantageous when the individual carriers of a series are not always properly closed-up. Thus collisions between the carriers will result in increased wear and tear of the carriers and the carrier track, and irregularities may occur as the series is pushed up by the drive means and as the foremost one of a series of carriers is pushed away to a different series. Treating the articles on the carriers during their movement becomes more difficult, too.

SUMMARY OF THE INVENTION

It is an object of the present invention to provide an improvement of the prior apparatus in which no irregularities or deviations occur in the movements of the individual carriers of the series, either as such a carrier is advancing or as such a carrier is stationary, and no corrective features, such as the use of centering means, are required.

To this effect, the apparatus for transporting articles is characterized, according to the present invention, in that the apparatus comprises joining means acting on the carriers of a series for keeping the carriers of the series in closed-up formation as they are moved.

Generally speaking, the joining means will be operable from a location situated outside the carriers.

The joining means may include electromagnets mounted on one or both end faces and/or one or both side faces of each carrier, and which can be switched on and off from outside the carriers, for example, through electric lines extending along the carrier track.

As a series of carriers is pushed on, the electromagnets between each pair of successive, contacting carriers are switched on with opposite magnetic polarities, as a result of which the carriers remain joined with each other. At a particular time after the termination of the movement of the series, at least the electromagnets between the two foremost carriers are switched off, whereafter the foremost carrier of the series can be removed and moved to a different series of carriers. If desired, the two or more foremost carriers of the series are removed at the same time, in which case, of course, the magnetic link between the group of foremost carriers with the series of remaining carriers should be broken.

The first-mentioned series receives one or more fresh carriers at the rear, whereafter the series with the new rearmost carriers is again pushed-on, after the electromagnets between the carriers have been energized. If, in the apparatus, a series of carriers is formed which have the side edges in contact with each other, similarly opposed electromagnets on the side faces of the carriers can be switched on or off.

If desired, in the cases referred to, only one electromagnet is disposed between two successive carriers of a series, which electromagnet on one of the carriers cooperates with an element of soft iron or any other magnetizable material on the other carrier.

It will be clear that, during the advance of a series, the carriers are kept together through magnetic force from the electromagnets, and that each time when the foremost carrier of the series is to be removed, the electromagnetic force retaining such carrier to the series is released to enable the removal of the carrier.

According to another and preferred embodiment of the invention, the joining means include a counter-pressure means which during the advance of the contacting series of carriers exerts a force opposite to the direction of movement on the foremost one of said series.

Naturally, the force to be exerted on the series of carriers by the counter-pressure means should be less than the pushing force from the drive means on the series of carriers, so that the balance is a positive pushing force which advances the series. The counter-pressure can be obtained in various ways, for example, by electromagnetic, hydraulic or pneumatic means, possibly in association with mechanical means. Alternatively, the counter-pressure means may be a purely mechanical structure, for example, incorporating a lever system and/or spring means. A preferred system is one in which the counter-pressure means includes a stop to be pushed against the foremost carrier and which is arranged to reciprocate in the direction of movement of the series of carriers. The stop may for example, be connected to a plunger rod reciprocating in a hydraulically or pneumatically operated cylinder. In this arrangement, the cylinder may be arranged so that, before the series of carriers is moved, the stop is moved in the direction of the foremost carrier by supplying a pressure fluid to the cylinder until the stop comes to rest against the carrier. When the series of carriers is now pushed on by the drive means, the stop will be pushed back also. During this push-back movement, the stop can exert counter-pressure by virtue of the resistance which the plunger rod connected to the stop experiences during the back stroke in the cylinder. This resistance is, for example, the result of pressure fluid flowing away from the cylinder to a discharge line. In the discharge line, means may be incorporated to increase or control the magnitude of the flow resistance in the line, such as a throttle plate, which may or may not be replaceable, and/or a pressure regulator.

A simple and hence preferred form of the counter-pressure means is that in which both this means and the drive means comprise hydraulic cylinders with plungers, and these cylinders are all operated with an hydraulic fluid of equal pressure, but in which the diameter of the plunger of the counter-pressure means is less than that of the drive means. It is thus achieved that the counter-force exerted on the series by the counter-pressure means automatically has a lower value than the push-on force exerted on the series by the drive means.

The apparatus may include more than one counter-pressure means, which each cooperate with a drive means.

A further advantage of the invention is that shorter times of movement of the series of carriers are possible. In the prior apparatus, shorter times of movement, and hence higher velocities, result in increased forces of acceleration on the carriers as they are pushed on, as a consequence of which the displacements of the individual carriers may be going to deviate from each other to a greater extent. Owing to the use of drive means which always keep the carriers together and as a consequence of which the carriers are all displaced in exactly the same degree as they are pushed on, this drawback does not occur in the apparatus according to the present invention.

Generally speaking, a series of carriers is incrementally pushed on a distance substantially equal to one or more times the dimension of one carrier (as viewed in the direction of advance) until the series of carriers strikes a fixed stop in the carrier track. In the prior apparatus, the displacement of each individual carrier in the moving series is not controlled. In the apparatus with counter-pressure means according to the present invention, the movement of the series of carriers takes place in a fully controlled manner between a drive means and a counter-pressure means. This makes it possible for the movement of the series of carriers to be interrupted in an orderly manner at any given place of the path ultimately to be traversed by the series, for example, after covering a distance equal to half the length of a carrier for causing the articles carried along by the carriers to be subjected to a treatment at these locations. In other words, a treatment of the articles is not only possible at the beginning or end of the total path to be traversed by the (unchanged) series, but also at any desired intermediate location and even during the movement, without changing the relative positions of the carriers.

BRIEF DESCRIPTION OF THE DRAWINGS

The invention will be described in more detail hereinafter, by way of example, with reference to the accompanying diagrammatic drawings. In the drawings:

FIG. 1 shows in top plan view an apparatus according to the invention in which the joining means take the form of counter-pressure means; and FIGS. 2a-2h show the apparatus of FIG. 1 in top plan view during successive stages during use.

DETAILED DESCRIPTION

FIG. 1 shows a rectangular carrier track 1 with two long rectilinear track portions 1a and two short track portions 1b. Contained in the track are identical carriers 2, movable along the track, for carrying one or more articles. In the example, the carriers 2 take the form of square flat tiles, in a total of twelve. The bottom surface of the carriers bears on guides in the carrier track, and the track includes guides for guiding the carriers along the side edges thereof.

The carrier track is formed as a matrix system, that is to say, that both the long and the short track portions have a length amounting to a whole number of times the lengths of the carrier in the respective track portion. In FIG. 1, the length of the long track portions 1a equals six times the carrier length; the length of the short track portions 1b is three-times the carrier length. It will be noticed that the carrier track has two open or vacant places where there are no carriers. The position of the open places in the carrier track changes continually, however, as will become apparent later.

The apparatus further comprises four drive means 3a-d, each disposed in the vicinity of a corner of the track. Opposite each drive means is a counter-pressure means 4a-d. The means 3 and 4 are all formed identically as hydraulic cylinders, with a thin plunger rod 6 being arranged to reciprocate in cylinder 5. Plunger rod 6 includes at the end projecting from the cylinder a stop 8. In the retracted position of the plunger rod, stop 8 is received in a lateral recess of the carrier track, so that the carriers can pass the stop without hindrance. The cylinders are connected to conduits for the supply and discharge of fluid to and from the cylinders. The drive means are all operated at the same fluid pressure; the counter-pressure means 4 are also operated with mutually equal fluid pressure, which however is lower than that of the drive means. The result is that the counter-force to be exerted by the counter-pressure means 4 is less than the driving force from the drive means 3.

An alternative is for the counter-pressure means to be formed with plungers having a smaller diameter than that of the drive means. In this case, all cylinders may be operated with the same hydraulic pressure, while yet the counter-pressure force will be less than the driving force.

Along the carrier track, one or more treating devices (not shown) may be disposed for subjecting the articles carried along by the carrier to a treatment as they are stationary or during their advance along the track. In the latter case, it may be of particular importance that the carriers remain joined together, if the articles on some of the moving carriers are treated from one or more treating devices at the same time.

The operation of the apparatus will be further elucidated with reference to FIG. 2. FIG. 2a shows a position of the carriers in which the open or vacant places in the carrier track are in the right-hand top corner and in the left-hand bottom corner. All of the eight plunger rods of both the drive means 3 and the counter-pressure means 4 are in the retracted position. The plunger rods of the counter-pressure means 4a and 4c are now protracted simultaneously, whereby the stops come to rest against the foremost one of the shorter series of carriers contained in the short track portions (FIG. 2b). Subsequently, the drive means 3a and 3c are activated, for the short series to be simultaneously moved along the short track lengths (FIG. 2c). Owing to this movement, the plunger rods of the counter-pressure means 4a and 4c are pushed back, while the stops of these rods continue to be in contact with the carriers. The moving force acting on the carriers equals the pushing force exerted on them by the drive means, less the counter-pressure force exerted by the counter-pressure means. The sliding movement of the short series of carriers continues until the end of the short track portions is reached, whereafter the plunger rods of the drive means 3a and 3c are again retracted (FIG. 2d). In this situation, the foremost carrier of each short series can now be regarded as the rearmost one of a long series of carriers located in the long track portion.

FIG. 2e shows that, subsequently, the plunger rods of the counter-pressure means 4d and 4b are projected. By activation of the drive means 3b and 3d, the long series of carriers are now simultaneously moved in a manner similar to that described above with regard to the short series (FIG. 2f). When the long series have reached the end of the long track portions, the situation is as shown in FIG. 2g. Finally, the plunger rods of the drive means 3b and 3d are retracted (FIG. 2h) to create the same situation as shown in FIG. 2a at the beginning of the cycle, which can now be repeated.

I claim:

1. Apparatus for transporting articles, comprising:
a closed track including a plurality of rectilinear track portions arranged in a pattern having a length and a width and in a series such that each track portion has a leading end and a trailing end, the trailing end of each respective leading track portion in said series forming the leading end of each respective trailing track portion in said series;
a plurality of carriers supported on said track, each carrier being arranged to support one or more articles thereon and having a length and a width, all of said carriers being of equal length and all of said carriers being of equal width, each carrier thereby having four sides arranged in two sets of opposite sides;
each said track portion extending lengthwise of said pattern having a length which is an integral number times said carrier length and each said track portion extending widthwise of said pattern having a length which is an integral number times said carrier width, so that said closed track provides a given number of carrier location sites;
said carriers being provided on said closed track, some on each rectilinear track portion, in respective series, in a number of carriers which is sufficiently less than said given number of carrier location sites, that said carriers may be progressively shifted around said track by successive movements of series of carriers in a direction along respective rectilinear track portions in a sense always to occupy a previously vacant carrier location site downstream of a respective series of carriers and to vacate a previously-occupied carrier location site upstream of such respective series of carriers;
means, associated with each said rectilinear track portion for acting on the relatively trailing said side of the relatively trailing said carrier then occupying the relatively most upstream, carrier-occupied one of said carrier location sites of such rectilinear track portion, for driving the respective series one carrier location site forward per step; and
means associated with one of said rectilinear track portion and each series of carriers, for acting on each carrier in a respective series as that series of carriers is being shifted one step forward by said driving means, for maintaining all of the carriers in that series in trailing side-to-leading side abutment throughout accomplishment of such step forward;
said means for acting on each carrier in a respective series acting, in use, on a leading article in a respective said series as that series of carriers is being shifted one step forwards by said driving means, simultaneously with the respective said means for acting on said relatively trailing said side of a trailing article in the respective said series, in mutually opposite directions throughout an entire conveying step in which the respective series of carriers is being shifted one step forwards, for maintaining all of the carriers in that series in trailing side-to-leading side abutment.

2. The apparatus of claim 1, wherein:
each said driving means comprises a first device, arranged to apply a pushing force of a first, larger magnitude on the respective trailing carrier; and
each said means for maintaining all the carriers in a respective series in abutment comprises a second device, arranged to apply a counter-force of a second, smaller magnitude on the respective leading carrier, in opposition to the respective said pushing force.

3. The apparatus of claim 2, wherein:
each said driving means comprises a first extensible-retractable rod having a step arranged to engage the trailing side of respective trailing carrier, and means for extending and retracting said first rod; and
each said means for maintaining all the carriers in a respective series in abutment comprises an extensible-retractable rod having a stop arranged to engage the leading side of a respective leading carrier, and means for extending and retracting said second rod.

4. The apparatus of claim 3, wherein:
each said means for extending and retracting each said first and second rod comprises a respective fluid pressure-operated piston and cylinder arrangement.

5. The apparatus of claim 1, wherein:
said closed track is constituted by four said rectilinear track sections, arranged in a rectangle.

6. The apparatus of claim 5, wherein:
there are two less carriers provided on said track than there are carrier location sites provide on said track.

7. The apparatus of claim 6, wherein:
each said driving means comprises a first device, arranged to apply a pushing force of a first, larger magnitude on the respective trailing carrier; and
each said means for maintaining all the carriers in a respective series in abutment comprises a second device, arranged to apply a counter-force of a second, smaller magnitude on the respective leading carrier, in opposition to the respective said pushing force.

8. The apparatus of claim 7, wherein:
each said driving means comprises a first extensible-retractable rod having a stop arranged to engage the trailing side of a respective trailing carrier, and means for extending and retracting said first rod; and
each said means for maintaining all the carriers in a respective series in abutment comprises an extensible-retractable rod having a stop arranged to engage the leading side of a respective leading carrier, and means for extending and retracting said second rod.

* * * * *